US012351201B2

(12) United States Patent
Choi

(10) Patent No.: US 12,351,201 B2
(45) Date of Patent: Jul. 8, 2025

(54) SIMULATION LEARNING-BASED DROWSY DRIVING SIMULATION PLATFORM SYSTEM AND METHOD FOR DETECTING CARELESS DRIVING IN CONJUNCTION WITH DEEP LEARNING

(71) Applicant: HYUNDAI MOBIS CO., LTD., Seoul (KR)

(72) Inventor: A Ra Choi, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 252 days.

(21) Appl. No.: 17/891,325

(22) Filed: Aug. 19, 2022

(65) Prior Publication Data
US 2023/0057662 A1  Feb. 23, 2023

(30) Foreign Application Priority Data

Aug. 20, 2021 (KR) .................. 10-2021-0110483

(51) Int. Cl.
*B60W 50/14* (2020.01)
*B60W 10/18* (2012.01)
*B60W 10/20* (2006.01)
*B60W 30/14* (2006.01)
(Continued)

(52) U.S. Cl.
CPC ............ *B60W 50/14* (2013.01); *B60W 10/18* (2013.01); *B60W 10/20* (2013.01); *B60W 30/14* (2013.01); *G06V 10/776* (2022.01); *G06V 20/597* (2022.01); *B60W 2420/403* (2013.01); *B60W 2540/043* (2020.02); *B60W 2540/229* (2020.02);
(Continued)

(58) Field of Classification Search
CPC .......... G06V 20/597; B60W 2540/229; B60W 2540/221–26; B60W 60/0059; B60W 2420/403; B60W 2555/20; B60W 50/12; B60W 50/14; B60W 50/16; B60W 50/0098; B60W 2050/143; B60W 2050/146; B60W 10/18; B60W 10/184–196; B60W 10/20; B60W 30/08; B60W 30/10–17
See application file for complete search history.

(56) References Cited

U.S. PATENT DOCUMENTS 11,643,102 B1* 5/2023 Calmer .................. G06N 3/047
340/576
2017/0293299 A1* 10/2017 Matsushita ............ B60W 10/04
(Continued)

*Primary Examiner* — Spencer D Patton
(74) *Attorney, Agent, or Firm* — NovoTechIP International PLLC

(57) ABSTRACT

Disclosed is a simulation learning-based drowsy driving simulation platform system for detecting careless driving in conjunction with deep learning, the simulation learning-based drowsy driving simulation platform system comprising: a drive state warning device configured to determine a driver's careless driving from a captured image, determine a driver's careless driving determination level, and output the determined level; a smart cruise control interworking part configured to transmit the driver's careless driving determination level outputted from the drive state warning device; and a smart cruise control processing part configured to control a vehicle according to the driver's careless driving determination level transmitted by the smart cruise control interworking part, during a smart cruise control operation.

14 Claims, 6 Drawing Sheets

(51) Int. Cl.
*G06V 10/776* (2022.01)
*G06V 20/59* (2022.01)

(52) U.S. Cl.
CPC ..... *B60W 2540/30* (2013.01); *B60W 2555/20* (2020.02)

(56) References Cited

U.S. PATENT DOCUMENTS

2018/0004205 A1\* 1/2018 Matsunaga .......... G05D 1/0274
2020/0322518 A1\* 10/2020 Nagata .................. H04N 23/50

\* cited by examiner

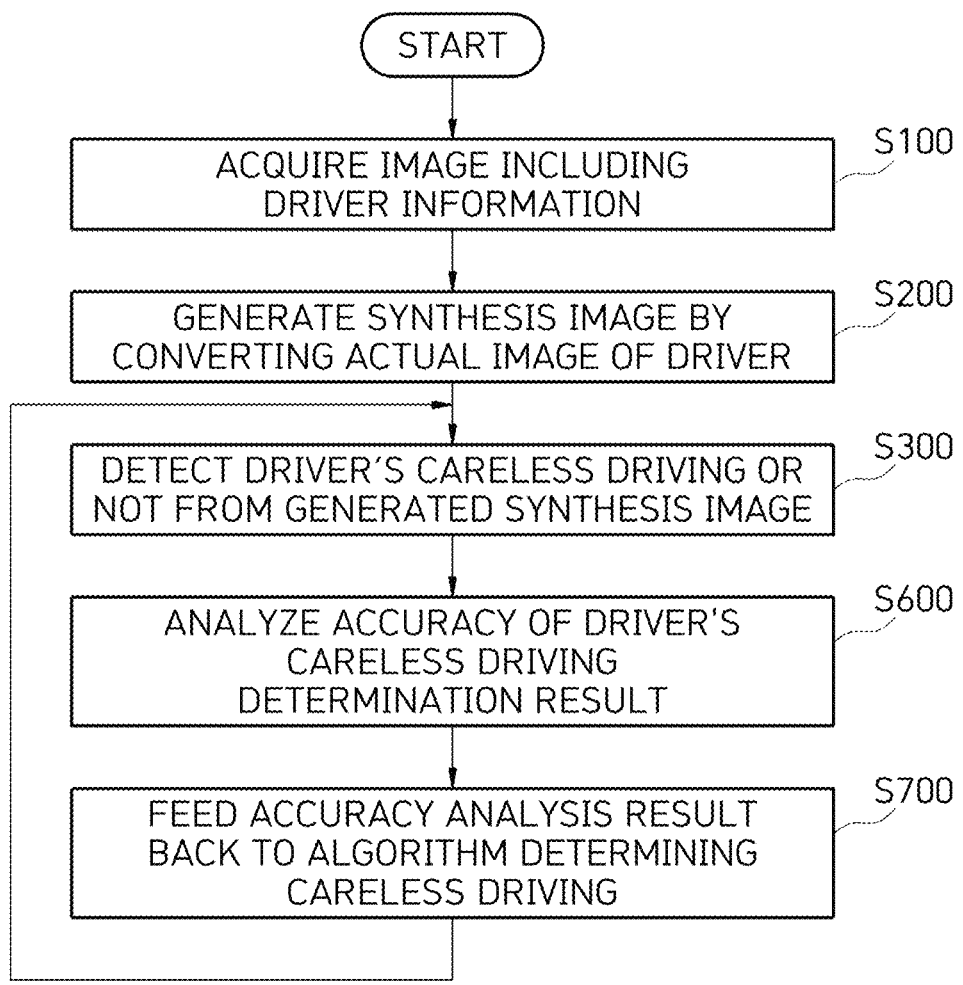

SIMULATION LEARNING-BASED DROWSY DRIVING SIMULATION PLATFORM SYSTEM AND METHOD FOR DETECTING CARELESS DRIVING IN CONJUNCTION WITH DEEP LEARNING

CROSS-REFERENCE TO RELATED APPLICATIONS

This application claims the benefit of priority to Korean Patent Application No. 10-2021-0110483, filed on Aug. 20, 2021, the disclosure of which is incorporated herein by reference in its entirety.

TECHNICAL FIELD

The present disclosure relates to a simulation learning-based drowsy driving simulation platform system and a method for detecting careless driving in conjunction with deep learning, and more particularly, to a simulation system for careless driving of a driver during driving.

BACKGROUND

The conventional simulation method for careless driving of a driver during driving relates to a method for estimating the driver's gaze area, and provides a method for estimating the driver's gaze area, which can extract a ground truth from a simulation environment, extract features from an image, and then learn the extracted features and gaze area by using a knowledge transfer technique for a pre-trained model, for analyzing the driver's convenience and condition in an advanced driver assistance system (ADAS) environment.

However, the conventional simulation method for careless driving of a driver during driving has a problem in that verifying the function by creating a driver's careless state in an actual vehicle driving situation has a high risk of an accident, and the accuracy of verification is low due to the limitation of the number of simulations.

SUMMARY

Various embodiments are directed to a drowsy driving simulation platform system which can convert an image of a driver with different hair, gender, age, skin color and expression and an image in which vehicle vibration and external environmental effects are transformed, from one image acquired during driving, level careless driving information that can improve the accuracy of a careless driving determination result by applying the generated image to a simulation, and apply the leveled information to smart cruise control.

The problems to be solved by the present disclosure are not limited to the above-mentioned problems, and the other unmentioned problems will be clearly understood from the following description by those skilled in the art.

In an embodiment, a simulation learning-based drowsy driving simulation platform system for detecting careless driving in conjunction with deep learning includes: a drive state warning device configured to determine a driver's careless driving from a captured image, determine a driver's careless driving level, and output the determined level; a smart cruise control interworking part configured to transmit the driver's careless driving level outputted from the drive state warning device; and a smart cruise control processing part configured to control a vehicle according to the driver's careless driving level transmitted by the smart cruise control interworking part, during a smart cruise control operation.

The driver's careless driving level is one of a normal level indicating that the driver is in a normal state, a warning level indicating that the driver is in a distracted state, and a dangerous level indicating that the driver's careless driving level is in a drowsy state.

The smart cruise control processing part performs a smart cruise control function set by a driver when the driver's careless driving level is in a normal level state, controls steering and braking of the vehicle in addition to a general smart cruise control function when the driver's careless driving level is in a warning level state, and provides warning information by using vibration and sound while controlling the steering and braking of the vehicle in addition to the general smart cruise control function when the driver's careless driving level is in a dangerous level state.

The drive state warning device includes: an image acquisition unit configured to provide a driver synthesis image converted by applying driving environment information to an image of the driver whose image features are changed; a vehicle information synchronization unit configured to provide the image of the driver with the driving environment information; and a careless driving determination unit configured to determine the driver' careless driving or not from the driver synthesis image in which the driving environment information is synthesized, and determine a level of the determined driver's careless driving.

The simulation learning-based drowsy driving simulation platform system further includes an accuracy analysis part configured to analyze accuracy of the determination of the driver's careless driving or not and accuracy of the determination result of the driver's careless driving level, which are analyzed by the careless driving determination unit, and feed the analyzed determination result back to the careless driving determination unit.

In an embodiment, a method of controlling a simulation learning-based drowsy driving simulation platform for detecting careless driving in conjunction with deep learning includes: acquiring an actual image of a driver; generating a synthesis image by converting the actual image of the driver; determining the driver's careless driving or not from the generated synthesis image; detecting a driver's careless driving level from the generated synthesis image; and controlling a vehicle according to the detected driver's careless driving level, during a smart cruise control operation.

The generating of the synthesis image by converting the actual image of the driver includes: generating first simulation target images (1*N pieces) in which appearance information of the driver is reflected in the actual image of the driver; generating second simulation target images (1*N*X pieces) in which environment information of the vehicle is reflected in the acquired actual image, which is a simulation target image; and generating third simulation target images (1*N*X*Y pieces) in which external environment information is reflected in the generated second simulation target images, wherein one or more of three processes included in the generating of the synthesis image are carried out.

The appearance information of the driver is one of the driver's hair, gender, age, skin and color.

The environment information of the vehicle is vibration information of the vehicle.

The external environment information is one of illuminance environment information and weather environment information.

The driver's careless driving level is one of a normal level in which the driver's careless driving level is in a normal state, a warning level in which the driver's careless driving level is in a distracted state, and a dangerous level in which the driver's careless driving level is in a drowsy state.

The controlling of the vehicle according to the detected driver's careless driving level includes: performing a smart cruise control function set by the driver when the driver's careless driving level is in a normal level state; controlling steering and braking of the vehicle in addition to a general smart cruise control function when the driver's careless driving level is in a warning level state; and providing warning information by using vibration and sound while controlling the steering and braking of the vehicle in addition to the general smart cruise control function when the driver's careless driving level is in a dangerous level state.

In accordance with the embodiment of the present disclosure, a vehicle may actively determine the degree of control and automatic driving intervention of smart cruise control on the basis of a drive state warning device, thereby providing more stable smart cruise control.

Furthermore, in accordance with the embodiment of the present disclosure, careless driving learning may be performed by using not only shooting information of a driver during actual driving but also simulation target images generated through the captured image information, which makes it possible to perform more wide careless driving learning.

BRIEF DESCRIPTION OF THE DRAWINGS

FIG. 9 is a flowchart for describing a learning method for improving the accuracy of a driver's careless driving determination result in a naming method according to an embodiment of the present disclosure.

DETAILED DESCRIPTION

The advantages and characteristics of the present disclosure and a method for achieving the advantages and characteristics will be clearly understood through embodiments to be described below in detail with reference to the accompanying drawings. However, the present disclosure are not limited to the embodiments disclosed below, and may be embodied in various different forms. These embodiments are provided to make this disclosure thorough and complete and to fully convey the scope of the present disclosure to those skilled in the art to which the present disclosure pertains. The present disclosure is only defined by the claims. Terms used in this specification are used for describing embodiments, not limiting the present disclosure. The terms of a singular form may include plural forms unless referred to the contrary. The term such as "comprise" or "comprising" used in the specification specifies a mentioned component, step, operation and/or element, but does not exclude the presence or addition of one or more other components, steps, operations and/or elements.

Figure 1:
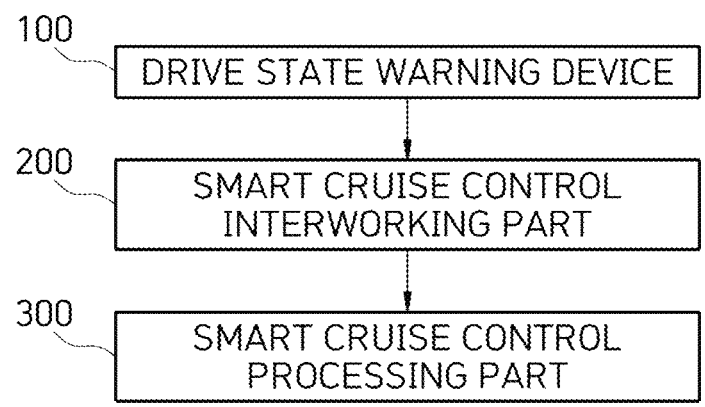
FIG. 1 is a block diagram illustrating a simulation learning-based drowsy driving simulation platform system for detecting careless driving in conjunction with deep learning according to an embodiment of the present disclosure.

FIG. 1 is a functional block diagram illustrating a simulation learning-based drowsy driving simulation platform system for detecting careless driving in conjunction with deep learning according to an embodiment of the present disclosure.

As illustrated in FIG. 1, the simulation learning-based drowsy driving simulation platform system for detecting careless driving in conjunction with deep learning according to the embodiment of the present disclosure includes a drive state warning device 100, a smart cruise control interworking part 200, and a smart cruise control processing part 300.

The drive state warning device 100 determines the driver's careless driving from a captured image, determines a driver's careless driving level, and outputs the determined level to the smart cruise control interworking part 200.

Figure 2:
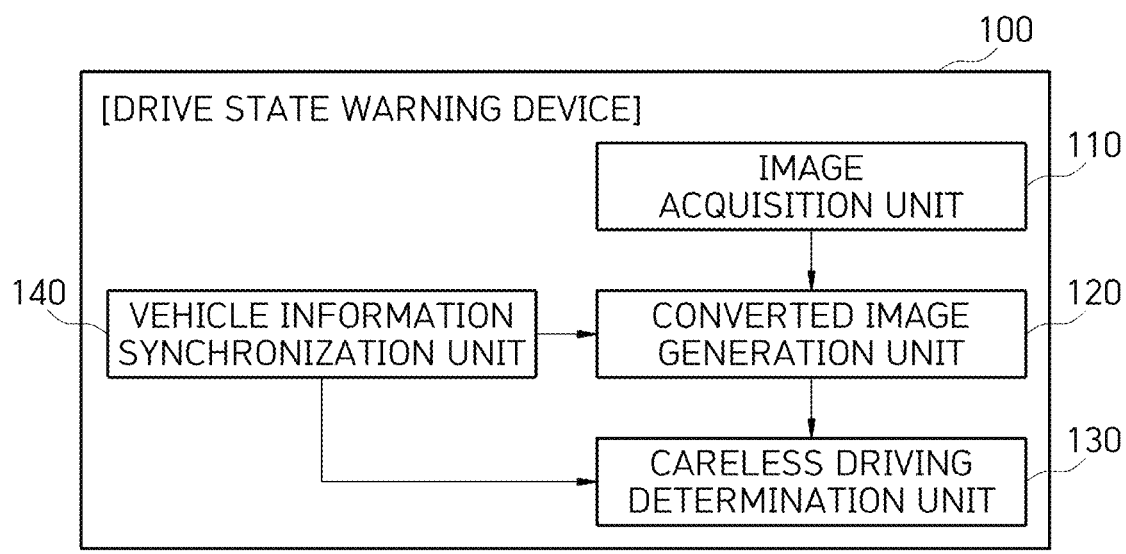
FIG. 2 is a block diagram illustrating a detailed configuration of an image acquisition part illustrated in FIG. 1.

As illustrated in FIG. 2, the drive state warning device 100 according to the embodiment of the present disclosure includes an image acquisition unit 110, a converted image generation unit 120, a careless driving determination unit 130, and a vehicle information synchronization unit 140.

The image acquisition unit 110 acquires image information including a driver inside the vehicle. It is preferable that a camera is used as the image acquisition unit 110.

Figure 3:
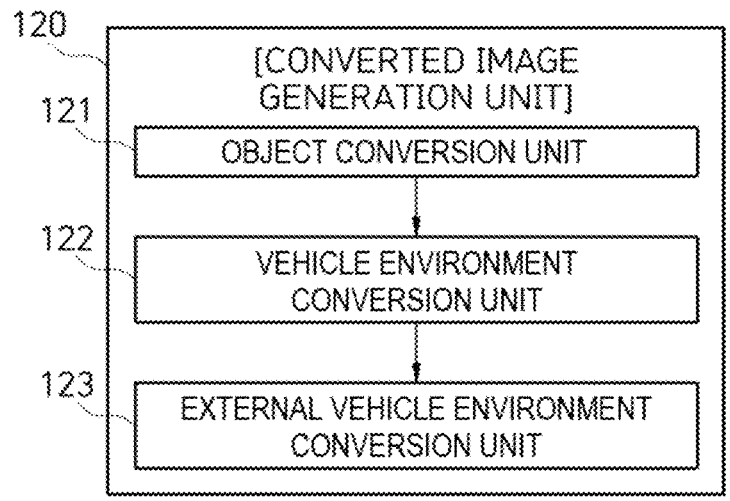
FIG. 3 is a functional block diagram illustrating a detailed configuration of a converted image generation part illustrated in FIG. 2.
Figure 4:
FIG. 4 is a reference diagram illustrating an example of simulation target images generated through the converted image generation part illustrated in FIG. 2.

The converted image generation unit 120 generates simulation target images (1*N pieces) by converting appearance information of an object from the acquired image. As illustrated in FIG. 3, the converted image generation unit 120 according to the embodiment of the present disclosure includes an object conversion unit 121 that converts an image or an object by using an image synthesis technique. Naver's StarGAN (unified generative adversarial networks for multi-domain image-to-image translation) algorithm may be used for the object conversion unit 121. Herein, the appearance information of the driver may be a hair style, skin color, eye color, etc. as illustrated in FIG. 4.

In the image synthesis technique used in the present embodiment, a StarGAN's generator may be used, which learns fluid conversion of an image into a corresponding domain by inputting the image and domain information instead of learning fixed translation (black-to-blond hair). A label is needed to indicate the domain information. During learning, a target domain level is randomly generated, and a model fluidly converts an input image and a target image into a target domain. Accordingly, a domain label may be controlled, and an image may be converted to a desired domain.

A mask vector is added to a domain level to enable learning between domains in different data sets. The image synthesis technique enables a model to ignore an unknown level and focus only on a label provided from a specific data set. In this way, the model may synthesize a facial expression from a CelebFaces Attributes Dataset (CelebA) image by using features learned from Radboud Faces Database (RaFD). As illustrated in FIG. 4, it is described in the present embodiment that domains such as hair, gender, age, skin color and facial expression information is used as the appearance information of the object.

The careless driving determination unit 130 determines the driver's careless driving or not by using the generated simulation target images. In the present embodiment, the careless driving determination unit 130 detects gaze information of the object from the simulation target images, compares the detected gaze information with driving information, steering information and vehicle environment information, which is information on lane departure, and determines a careless driving state.

The careless driving determination unit 130 determines a level of the determined driver's careless driving.

Therefore, according to an embodiment of the present disclosure, careless driving learning may be performed by using not only shooting information of the driver during actual driving but also the simulation target images generated through the captured image information, which makes it possible to perform more wide careless driving learning.

In addition, according to an embodiment of the present disclosure, the careless driving learning may be performed on virtual person data on the basis of a deep learning image synthesis technology, which makes it possible to reduce the cost required for learning and increase the efficiency of development by saving the time required for learning.

In an embodiment of the present disclosure, the drive state warning device 100 further includes the vehicle information synchronization unit 140 that synchronizes vehicle information with the image acquired through the image acquisition unit 110 and logs the synchronized vehicle information. The vehicle information may increase the accuracy of careless driving learning.

As illustrated in FIG. 3, the converted image generation unit 120 generates second simulation target images (1*N*X pieces) in which environment information of a vehicle is reflected in the generated simulation target images. It is preferable that the environment information of the vehicle is vibration information of the vehicle. To this end, the converted image generation unit 120 may include a vehicle environment conversion unit 122 that applies the environment information of the vehicle to the first simulation target images. In this case, vibration information generated when the driver drives on a general paved road, vibration information generated when the driver drives on an unpaved road, vibration information when the driver drives on a hollow pothole, and vibration information generated when the driver drives on a speed bump may be used for the vibration information of the vehicle.

In addition, the converted image generation unit 120 generates third simulation target images (1*N*X*Y pieces) in which external environment information is reflected in the generated second simulation target images. The external environment information may be one of weather environment information and illuminance environment information.

To this end, as illustrated in FIG. 3, the converted image generation unit 120 may include an external environment conversion unit 123 that applies a condition corresponding to external environment to the second simulation target images.

In the present embodiment, it is described that the converted image generation unit 120 sequentially applies the object conversion unit 121, the vehicle environment conversion unit 122, and the external environment conversion unit 123 and generates the 1*N*X*Y simulation target images, but the converted image generation unit 120 may apply the object conversion unit 121, the vehicle environment conversion unit 122, and the external environment conversion unit 123 in parallel to one another and generate various types of simulation target images such as 1*N, 1*X and 1*Y simulation target images. The converted image generation unit 120 may provide the driving environment information, i.e., illuminance environment information and weather environment information, to the image of the driver.

The smart cruise control interworking part 200 transmits the driver's careless driving level, which is outputted from the drive state warning device 100, to the smart cruise control processing part 300.

The smart cruise control processing part 300 controls the vehicle according to the driver's careless driving level transmitted through the smart cruise control interworking part 200, during a smart cruise control operation.

The driver's careless driving level is one of a normal level in which the driver's careless driving level is in a normal state, a warning level in which the driver's careless driving level is in a distracted state, and a dangerous level in which the driver's careless driving level is in a drowsy state. Since the driver's normal, distracted, and drowsy states can be detected through various conventional methods through the driver's pupils and head movements, a detailed description thereof will be omitted.

Accordingly, the smart cruise control processing part 300 performs a smart cruise control function set by the driver when the driver's careless driving level is in a normal level state, controls steering and braking of the vehicle in addition to the general smart cruise control function when the driver's careless driving level is in a warning level state, and provides warning information by using vibration and sound while controlling the steering and braking of the vehicle in addition to the general smart cruise control function when the driver's careless driving level is in a dangerous level state.

In an embodiment of the present disclosure, the careless driving determination unit 130 includes an accuracy analysis unit 132 that analyzes accuracy of the determination of the driver's careless driving or not and accuracy of the determination result of the driver's careless driving level, which are analyzed by the careless driving determination unit 130, and feeds the analyzed determination result back to the careless driving determination unit 130.

Figure 5:
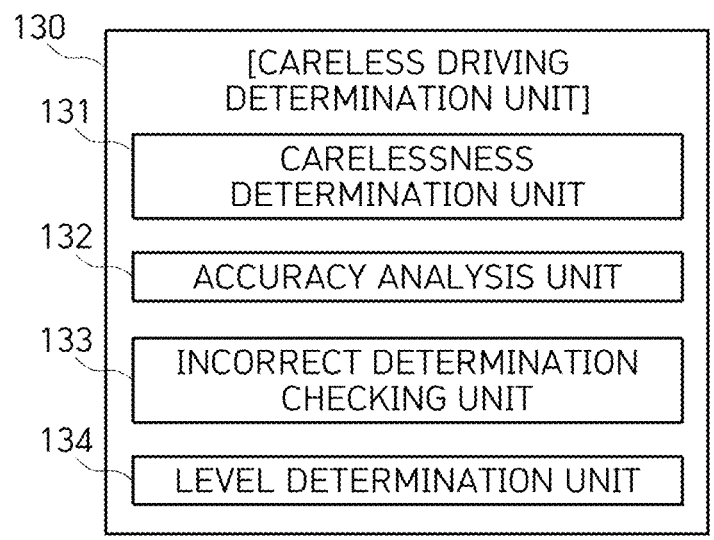
FIG. 5 is a functional block diagram illustrating a detailed configuration of a careless driving determination part illustrated in FIG. 2.

As illustrated in FIG. 5, the careless driving determination unit 130 includes a carelessness determination unit 131, the accuracy analysis unit 132, an incorrect determination checking unit 133, and a level determination unit 134. The carelessness determination unit 131 determines the driver's careless driving or not from an image inputted through a preset careless driving determination system. The accuracy analysis unit 132 combines characteristics of the inputted image and vehicle information, and analyzes the accuracy of the careless driving determination result. The incorrect determination checking unit 133 compares the analysis result of the accuracy of the careless driving determination result with driver input information, and feeds incorrect determination information on determination logic back. The level determination unit 134 outputs the determined driver's careless driving result in units of levels.

The incorrect determination checking unit 133 provides the driver, which is a shooting target, with the careless driving determination result and simulation target image information through the carelessness determination unit 131, and allows the driver to check whether the determination result is incorrect or not, which makes it possible to increase the accuracy of the determination logic.

Figure 6:
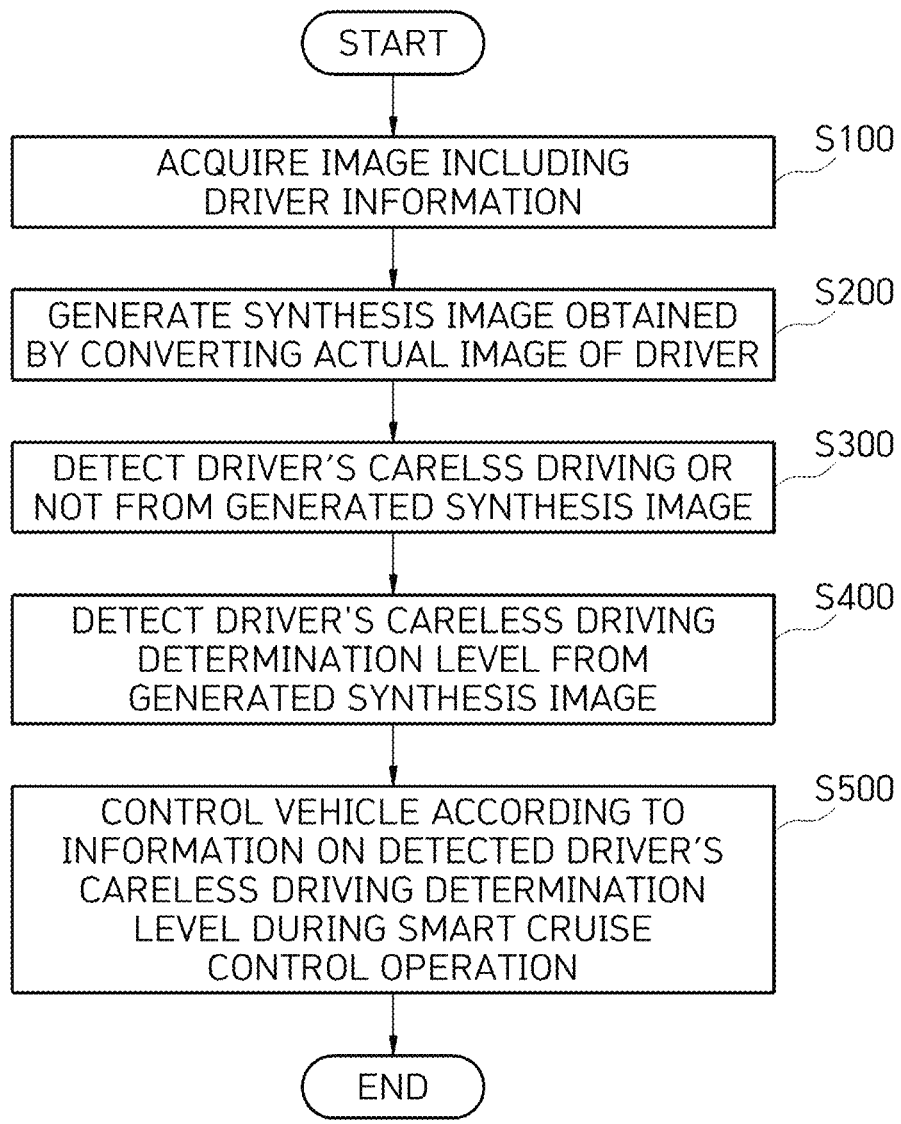
FIG. 6 is a flowchart for describing a method of controlling a simulation learning-based drowsy driving simulation platform for detecting careless driving in conjunction with deep learning according to an embodiment of the present disclosure.

A method of controlling a simulation learning-based drowsy driving simulation platform for detecting careless driving in conjunction with deep learning according to an embodiment of the present disclosure is described with reference to FIG. 6.

First, an actual image including driver information is acquired in step S100.

Subsequently, a synthesis image is generated by converting the actual image of the driver, in step S200.

Figure 7:
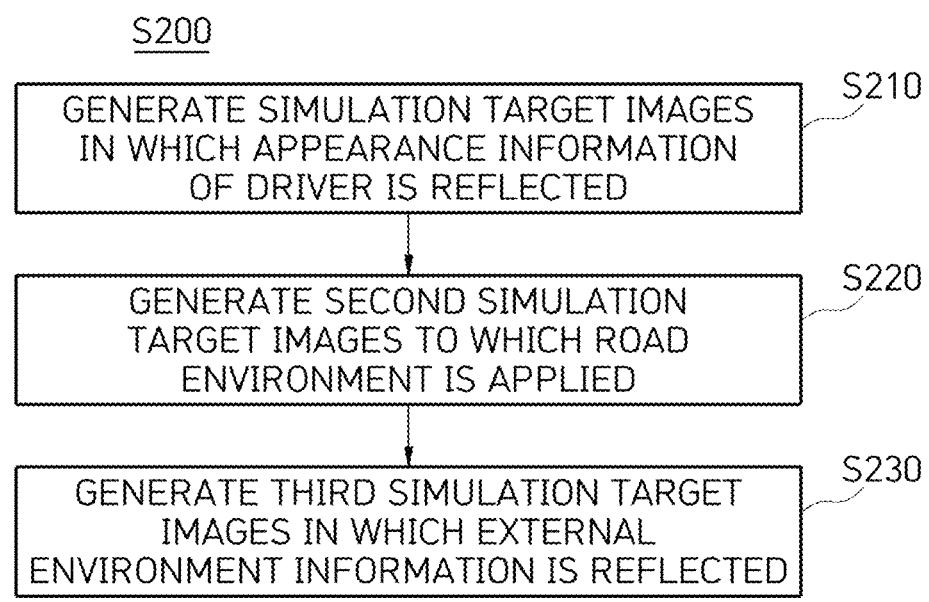
FIG. 7 is a flowchart for describing a step of generating a synthesis image by converting an actual image of a driver illustrated in FIG. 6.

Hereinafter, a step of generating the synthesis image by converting the actual image of the driver is described with reference to FIG. 7.

First, First simulation target images (1*N pieces) in which appearance information of the driver is reflected in the actual image of the driver is generated in step S210. Herein, it is preferable that the appearance information of the driver is one of the driver's hair, gender, age, skin color, and vibration information of an analyzed vehicle.

Subsequently, second simulation target images (1*N*X pieces) in which environment information of the vehicle is reflected in the acquired actual image, which is a simulation target image, are generated in step S220. Herein, it is preferable that the environment information of the vehicle is vibration information of the vehicle.

Thereafter, third simulation target images (1*N*X*Y pieces) in which external environment information is reflected in the generated second simulation target images are generated in step S230. Herein, it is preferable that the external environment information is one of illuminance environment information and weather environment information.

In step S200 of generating the synthesis image by converting the actual image of the driver, step S230 of generating 1*N*X*Y simulation target images may be sequentially performed or be applied, and thus various types of simulation target images such as 1*N, 1*X and 1*Y simulation target images may be generated.

Subsequently, the driver's careless driving or not is detected from the generated synthesis image in step S300.

Subsequently, a driver's careless driving level is detected from the generated synthesis image in step S400. The driver's careless driving level is one of a normal level in which the driver's careless driving level is in a normal state, a warning level in which the driver's careless driving level is in a distracted state, and a dangerous level in which the driver's careless driving level is in a drowsy state.

Next, during a smart cruise control operation, the vehicle is controlled according to the detected driver's careless driving level in step S500.

Figure 8:
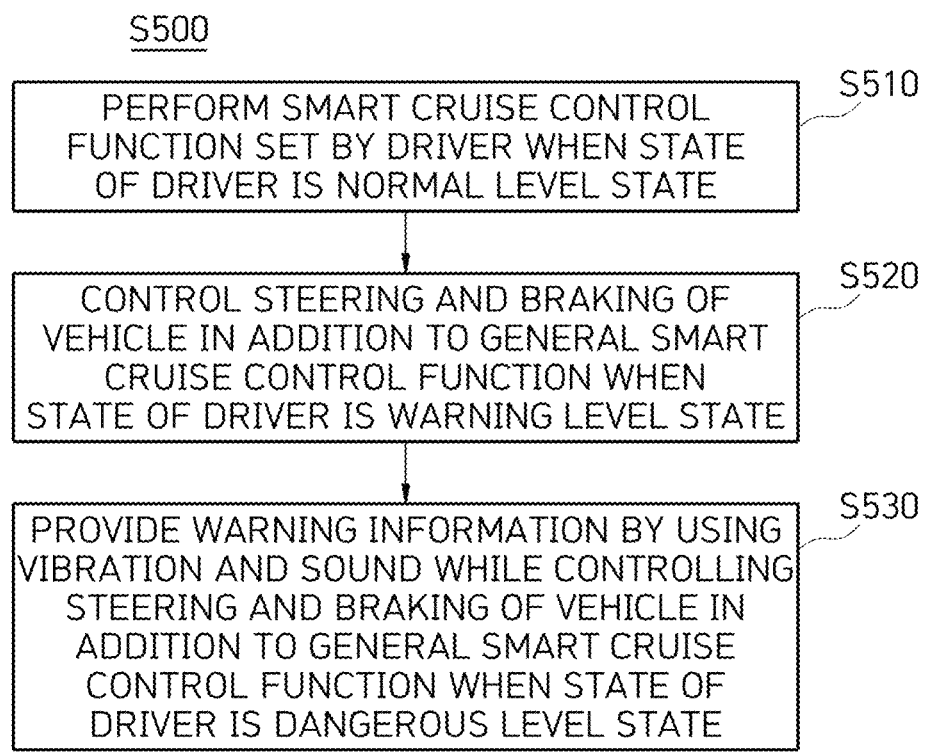
FIG. 8 is a flowchart for describing a detailed process of a step of controlling a vehicle according to a detected driver's careless driving level illustrated in FIG. 6.

Hereinafter, a detailed process of controlling the vehicle according to the detected driver's careless driving level is described with reference to FIG. 8.

When the driver's careless driving level is in the normal level state, the smart cruise control function set by the driver is performed in step S510, when the driver's careless driving level is in the warning level state, steering and braking of the vehicle in addition to the general smart cruise control function are controlled in step S520, and when the driver's careless driving level is in the dangerous level state, warning information is provided by using vibration and sound while the steering and braking of the vehicle in addition to the general smart cruise control function are controlled, in step S530.

FIG. 9 is a flowchart for describing a method of learning a step of determining the driver's careless driving in a naming method according to an embodiment of the present disclosure.

As described FIG. 9, in the naming method according to the embodiment of the present disclosure, the accuracy of the driver's careless driving determination result is analyzed on the basis of the combination of the characteristics of the input image and the vehicle information in step S600, and the accuracy analysis result is fed back to step S300 of determining the driver's careless driving in step S700.

For reference, the components according to an embodiment of the present disclosure may be implemented in the form of software or hardware, such as a field programmable gate array (FPGA) or an application specific integrated circuit (ASIC), and perform specific roles.

However, the meaning of the "components" is not limited to software or hardware, and each of the components may be configured to reside in an addressable storage medium and to reproduce one or more processors.

For example, the components include components such as software components, object-oriented software components, class components, and task components, processes, functions, attributes, procedures, subroutines, program code segments, drivers, firmware, microcode, circuits, data, databases, data structures, tables, arrays, and variables.

Components and functions provided in the corresponding components may be combined into a smaller number of components or may be further divided into additional components.

In this case, it will be understood that each block of flowchart diagrams and combinations of the flowchart diagrams may be performed by computer program instructions. These computer program instructions may be installed on a processor of a general purpose computer, a special purpose computer, or other programmable data processing equipment such that the instructions executed by the processor of the computer or other programmable data processing equipment generate parts for performing functions described in a block(s) of the flowchart. In order to implement functions in a specific manner, the computer program instructions can also be stored in a computer available memory or computer readable memory that can support computers or programmable data processing equipment. Therefore, the instructions stored in the computer available memory or computer readable memory can produce an article of manufacture containing instruction parts that perform the functions described in the block(s) of the flowchart. Since the computer program instructions can also be installed on the computer or other programmable data processing equipment, the computer program instructions can create processes that are executed by a computer through a series of operations that are performed on the computer or other programmable data processing equipment so that the instructions performing the computer or other programmable data processing equipment can provide operations for executing the functions described in a block (blocks) of the flowchart.

In addition, each block may represent modules, segments, or a portion of code, which include one or more executable instructions to perform one or more specific logical functions. It should also be noted that, in some alternative embodiments, it is also possible for the functions mentioned in the blocks to occur out of order. For example, two blocks illustrated in succession can be substantially performed simultaneously or, in some cases, the two blocks can be performed in the reverse order according to corresponding functions.

In this case, the term " . . . part" or " . . . unit" used in the embodiments refers to a software component or a hardware component such as an FPGA or an ASIC, and performs predetermined roles. It should, however, be understood that the term " . . . part" or " . . . unit" is not limited to a software or hardware component. The " . . . part" or " . . . unit" may be configured to reside in an addressable storage medium or to reproduce one or more processors. Thus, as an example, the " . . . part" or " . . . unit" includes components such as software components, object-oriented software components, class components, and task components, and processes, functions, attributes, procedures, sub-routines, segments of program code, drivers, firmware, microcode, circuits, data, databases, data structures, tables, arrays, and variables. The functions provided in the components and " . . . parts" or " . . . unit" may be combined into a smaller number of components and " . . . parts" or " . . . unit", or may be further divided into additional components and " . . . parts" or " . . . units." In addition, the components and the " . . . parts" or " . . . units" may be implemented to reproduce one or more CPUs in a device or a secure multimedia card.

Although the configuration of the present disclosure has been described above in detail with reference to the accompanying drawings, the description of the configuration is for illustrative purposes only, and various modifications and alternations may be made within the scope of the technical spirit of the present disclosure by those skilled in the art to which the present disclosure pertains. Accordingly, the protection scope of the present disclosure should not be limited to the above-described embodiments and should be defined by the description of the appended claims.

What is claimed is:

1. A method of detecting, using a simulation learning-based drowsy driving simulation platform system, careless driving by a driver of a vehicle in conjunction with deep learning, the method comprising:
   acquiring an actual image of the driver using an image acquisition unit;
   acquiring vibration information of the vehicle;
   generating a synthesis image by converting the acquired actual image received from the image acquisition unit into the synthesis image using a converted image generation unit, wherein generating the synthesis image includes:
      generating first simulation target images using the converted image generation unit, wherein the first simulation target images are each based on the acquired actual image and each include different appearance information from one another and from appearance information of the acquired actual image; and
      generating second simulation target images using the converted image generation unit in which the vibration information of the vehicle is applied to the first simulation target images;
   determining, based on the synthesis image and using a careless driving determination unit, whether the driver is performing careless driving;
   determining, based on the synthesis image, a careless driving level of the driver; and
   controlling, during a smart cruise control operation of the vehicle, the vehicle based on the determined careless driving level.

2. The method of claim 1, wherein generating the synthesis image by converting the actual image of the driver includes performing:
   generating a plurality of third simulation target images by applying external environment information to the plurality of second simulation target images.

3. The method of claim 2, wherein appearance information of the driver includes at least one of the driver's hair, gender, age, skin color and vibration information of the vehicle.

4. The method of claim 2, wherein the external environment information includes at least one of illuminance environment information and weather environment information.

5. The method of claim 1, wherein the careless driving level is one of:
   a normal level indicating that the driver is in a normal state;
   a warning level indicating that the driver is in a distracted state; and
   a dangerous level indicating that the driver is in a drowsy state.

6. The method of claim 5, wherein controlling the vehicle based on the determined careless driving level includes:
   performing a smart cruise control function set by the driver when the determined careless driving level is the normal level;
   controlling steering and braking of the vehicle and performing the smart cruise control function when the determined careless driving level is the warning level; and
   providing a warning while controlling the steering and braking of the vehicle and performing the smart cruise control function when the determined careless driving level is the dangerous level.

7. The system of claim 1, wherein the vibration information is provided to the careless driving determination unit.

8. The system of claim 1, wherein the vibration information includes at least one of: vibration information when the driver drives on a general paved road; vibration information generated when the driver drives on an unpaved road; vibration information when the driver drives on a hollow pothole; and vibration information generated when the driver drives on a speed bump.

9. A system for detecting, using a simulation learning-based drowsy driving simulation platform system, careless driving by a driver of a vehicle in conjunction with deep learning, the system comprising:
   a processor; and
   a computer-readable medium in communication with the processor and storing instructions that, when executed by the processor, cause the processor to control the system to perform:
      acquiring an actual image of the driver using an image acquisition unit;
      acquiring vibration information of the vehicle;
   generating a synthesis image by converting the acquired actual image received from the image acquisition unit into the synthesis image using a converted image generation unit, wherein generating the synthesis image includes:
      generating first simulation target images using the converted image generation unit, wherein the first simulation target images are each based on the acquired actual image and each include different appearance information from one another and from appearance information of the acquired actual image; and
      generating second simulation target images using the converted image generation unit in which the vibration information of the vehicle is applied to the first simulation target images;

determining, based on the synthesis image and using a careless driving determination unit, whether the driver is performing careless driving;

determining, based on the synthesis image, a careless driving level of the driver; and controlling, during a smart cruise control operation of the vehicle, the vehicle based on the determined careless driving level.

10. The system of claim 9, wherein, for generating the synthesis image by converting the actual image of the driver, the instructions, when executed by the processor, further cause the processor to control the system to perform:

generating a plurality of third simulation target images by applying external environment information to the plurality of second simulation target images.

11. The system of claim 10, wherein appearance information of the driver includes at least one of the driver's hair, gender, age, skin color and vibration information of the vehicle.

12. The system of claim 10, wherein the external environment information includes at least one of illuminance environment information and weather environment information.

13. The system of claim 9, wherein the careless driving level is one of:

a normal level indicating that the driver is in a normal state;

a warning level indicating that the driver is in a distracted state; and a dangerous level indicating that the driver is in a drowsy state.

14. The system of claim 13, wherein controlling the vehicle based on the determined careless driving level includes:

performing a smart cruise control function set by the driver when the determined careless driving level is the normal level;

controlling steering and braking of the vehicle and performing the smart cruise control function when the determined careless driving level is the warning level; and providing a warning while controlling the steering and braking of the vehicle and performing the smart cruise control function when the determined careless driving level is the dangerous level.

* * * * *